United States Patent [19]
Saunders

[11] Patent Number: 5,845,192
[45] Date of Patent: Dec. 1, 1998

[54] WIRELESS BASE STATION

[75] Inventor: Robert Stanley Saunders, Surrey, England

[73] Assignee: Nokia Mobile Phones Limited, Salo, Finland

[21] Appl. No.: 627,372

[22] Filed: Apr. 4, 1996

[30]     Foreign Application Priority Data

Apr. 6, 1995 [GB] United Kingdom .................... 9507146

[51] Int. Cl.⁶ ...................................................... H04B 7/26
[52] U.S. Cl. .......................... 455/11.1; 455/436; 455/439; 370/331
[58] Field of Search ................................ 455/11.1, 15, 16, 455/17, 421, 422, 424, 425, 426, 436, 438, 439, 440; 370/315, 331, 333, 337

[56]              References Cited

U.S. PATENT DOCUMENTS

| | | | |
|---|---|---|---|
| 4,972,456 | 11/1990 | Kaczmarek et al. ...................... | 379/59 |
| 5,175,867 | 12/1992 | Wejke et al. ............................. | 455/439 |
| 5,345,448 | 9/1994 | Keskitalo ................................ | 370/95.3 |
| 5,410,733 | 4/1995 | Niva et al. .............................. | 455/33.2 |
| 5,483,668 | 1/1996 | Malkamaki et al. .................... | 455/33.2 |

FOREIGN PATENT DOCUMENTS

| | | |
|---|---|---|
| 0637144 A1 | 2/1995 | European Pat. Off. . |
| 285030 | 11/1988 | Japan .................................... 455/11.1 |

*Primary Examiner*—Thanh Cong Le
*Attorney, Agent, or Firm*—Perman & Green, LLP

[57]              ABSTRACT

A wireless base station operating in a system in which wireless base stations are used to provide a link between a remote fixed part and a handset and method of operation of the same. The wireless base station prevents unnecessary handover initiation by the handset in the event that the link between the wireless base station and remote fixed part is poor.

23 Claims, 4 Drawing Sheets

WIRELESS BASE STATION

BACKGROUND OF THE INVENTION

This invention relates to wireless base stations and in particular to wireless base stations for operation in digital cellular radio telephone systems such as those employing transmission by a plurality of carrier frequencies in frames, each consisting of a predetermined number of time slots. The invention also relates to a method of operation of such wireless base stations.

One type of digital system to which the invention relates is DECT (Digital European Cordless Telecommunications). A DECT system typically includes one fixed part, several remote fixed parts or fixed base stations and many portable parts or handsets. The fixed part is physically connected to a standard wireline telephone system, each remote fixed part is physically connected to the fixed part, and the portable handsets are in communication with a remote fixed part via an available over the air communication channel. Allocation of a channel, defined for the purposes of this application to be a combination of a carrier frequency and time slot, to a portable radio telephone when a connection is first required is called "call set-up". When a change in channel is required during a call to maintain call quality this is termed "handover". Handover can either be to a different channel at the same remote fixed part (intracell) or to a different channel at a different remote fixed part (intercell).

As well as allowing handover, the DECT protocol also provides for antenna diversity. Antenna diversity is the use of more than one antenna to combat fast fades in received signal strength that occur in a multipath propagation environment. These fast fades can vary greatly with short distances. A base of a fade in received signal strength is likely to occur at different times for different propagation paths. Under antenna diversity the signals received over individual propagation paths can be used alone or in combination to provide improved signals. For the purposes of this application the term 'handover' will be used to cover both channel handover and antenna diversity.

Each of the remote fixed parts of a DECT system supports a predetermined number of concurrent communication channels. If the number of potential users within the coverage area of the remote fixed part is too small to efficiently utilise the remote fixed part it is desirable to increase the coverage area of the remote fixed part to include more potential users. Under the DECT standard this can be achieved by providing one or more wireless base stations (otherwise known as repeaters). These receive signals from the remote fixed part on one channel and repeat the same information on a different channel. The signal is thereby broadcast an additional distance from the remote fixed part allowing more remote handsets to communicate with the remote fixed part. A wireless base station does not add any additional channels to the system but instead enables the area of coverage of the system to be extended. The advantage that a wireless base station gives over an additional remote fixed part is mainly one of cost. The specification of a wireless base station is typically more straight forward than for a remote fixed part and as it is in over-the-air contact with the remote fixed part, there is no significant installation expense or inconvenience.

Handover by a portable handset when in communication with a wireless base station occurs in the same way as handover when in communication with a remote fixed part. This can be intracell or intercell. Intracell handover includes handover to another wireless base station in contact with the same remote fixed part. Intercell handover includes handover to the remote fixed part with which the wireless base station is communicating, handover to another wireless base station in contact with a different remote fixed part and to a direct link with a different remote fixed part.

To date wireless base stations are usually envisaged as fixed in space, providing an increase in area coverage or perhaps being providing at strategic positions such as in houses to increase signal strength for users. Under these circumstances the link between the wireless base station and its associated remote fixed part is semi permanent. It is, however, envisaged that there may be occasions when the link between the wireless base station and the remote fixed part is corrupt and the question of wireless base station handover needs to be addressed, for example, if an obstruction deteriorates the channel or if the wireless base station is allowed a degree of mobility.

SUMMARY OF THE INVENTION

In accordance with a first aspect of the invention there is provided a wireless base station for use in a cellular radio telephone system in which a wireless base station is involved in establishing a communication channel between a fixed base station and a radio handset for transmitting signals from the fixed base station to the radio handset, the wireless base station comprising means responsive to an indication that the channel between the wireless base station and the fixed base station is corrupt for transmitting an adapted signal to the radio handset.

In accordance with a second aspect of the invention there is provided a cellular radio telephone system comprising a radio handset and a wireless base station for establishing a communication channel between a fixed base station and the radio handset, the wireless base station comprising means responsive to an indication that the channel between the wireless base station and the fixed base station is corrupt for transmitting an adapted signal to the radio handset.

In accordance with a third aspect of the invention there is provided a method of communicating between a wireless base station and a radio handset in a cellular radio telephone system in which a wireless base station is involved in establishing a communication channel between a fixed base station and a radio handset, the method comprising transmitting an adapted signal to the radio handset in response to an indication that the channel between the wireless base station and the fixed base station is corrupt.

Conventionally a wireless base station relays signals from the fixed base station to the radio handset. Signals that are corrupt as a result of a bad connection between the wireless base station and the fixed base station will be relayed to the radio handset. The radio handset will be unable to distinguish signals corrupted in this way from signals corrupted as a result of a bad connection between the radio handset and the wireless base station and may initiate handover unnecessarily.

It is generally preferable for unnecessary handover and handover requests to be kept to a minimum because, amongst other things, handover requests tend to result in channel interference. If all the radio handsets in communication with a particular wireless base station try to handover channels at the same time the wireless base station will be over stretched with access requests. Having failed to access a channel at the wireless base station an equivalent increase in handover requests is likely to be received at another wireless base station or fixed base station with similar consequences. In any event an undue number of unnecessary handover requests is likely to make the system unstable and are preferably to be avoided.

An adapted signal is sent to the radio handset to enable the radio handset to avoid unnecessarily initiating handover as a result of a poor channel between the fixed base station and the wireless base station.

The adapted signal may provide a signal to the radio handset that is capable of providing information on the quality of the channel between the radio handset and the fixed base station. The radio handset is then able to use its own algorithms and criteria to decide whether or not to handover based on the quality of the channel between the handset and the wireless base station.

Signal packets transmitted under the DECT protocol include error detection information. This can be used for detecting corrupt signals. If the error detection information of the received signal indicates that the channel is corrupt the adaption process preferably includes replacing the error detection information transmitted with the signal packet so that the error detection information in the signal packet transmitted to the radio handset does not indicate that the signal is corrupt. This ensures that the radio handset does not unnecessarily initiate handover.

One way in which the signal packet can be adapted to provide such a signal is by sending a dummy signal in place of the received signal. The dummy signal has its own set of error detection bits that are consistent with the signal being free of errors. The dummy signal is preferably a mute signal for telephony equipment as this minimises unwanted disruption to the audio output of the radio handset.

The wireless base station uses certain criteria to determine if the channel to the fixed base station is corrupt. Suitably the wireless base station will monitor signal packets received from the fixed base station to assess the signal quality to determine if the channel is corrupt. An algorithm employing suitable criteria can be used for assessing channel quality. The criteria used to determine if the channel is corrupt may be different in different circumstances. For example, the criteria for deciding if a signal packet should be adapted for transmission are not necessarily the same as the criteria applied for determining if a channel is corrupt for the purposes of initiating handover. It may, for example, be desirable to adapt the received signal each time a corrupt signal is detected, whereas handover initiation would only be necessary when the quality of the channel had deteriorated for a longer duration.

If, after a reasonable period, a suitable channel for communication with the fixed base station cannot be established, the wireless base station may suitably provide a signal indicative of a corrupt channel to the radio handset so that the handset is able once more to initiate handover in accordance with its own handover algorithms. The signal transmitted to the radio handset may simply be one or more corrupt signals received from the fixed base station.

In another embodiment of the invention the adapted signal may be a signal for indicating to the radio handset that it should pause for a period before initiating handover. This period is suitably of sufficient length to typically allow the wireless base station to initiate and accomplish handover.

BRIEF DESCRIPTION OF THE DRAWINGS

A portion of a cellular radio telephone system consisting of a fixed base station two wireless base stations and a radio handset in accordance with the invention will now be described, by way of example, with reference to the accompanying drawings, in which.

DETAILED DESCRIPTION OF THE INVENTION

Figure 1:
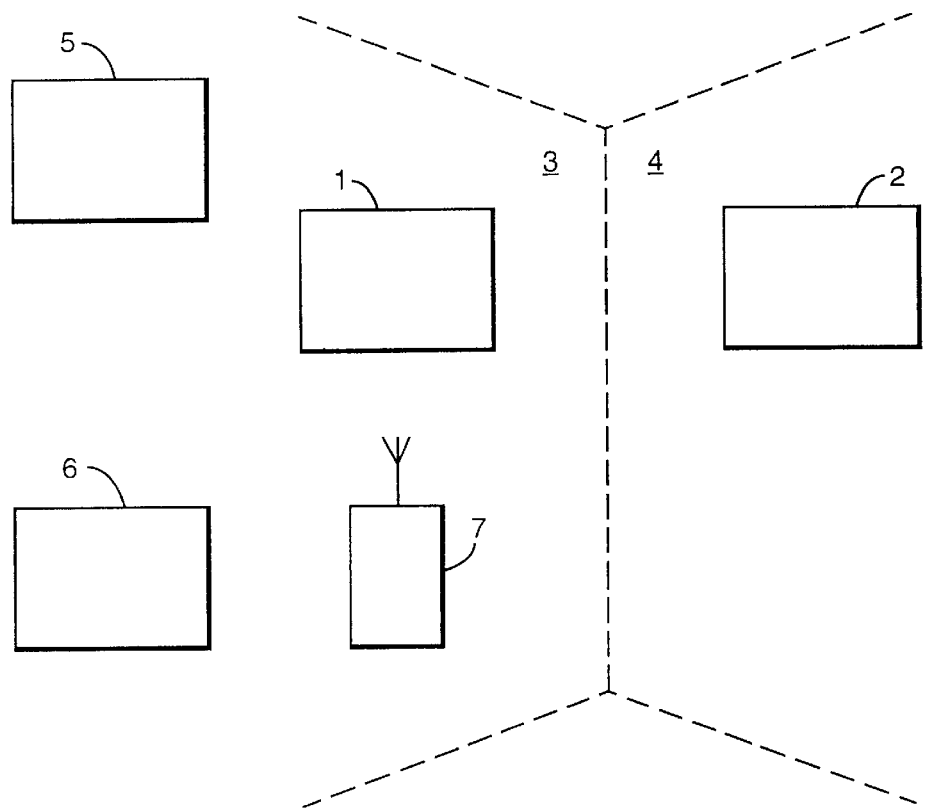
FIG. 1 is a schematic representation of the radio telephone system.

Referring to FIG. 1, the portion of the radio system depicted comprises two fixed base stations 1, 2, serving respective cells 3 and 4 representing geographical areas of coverage which may be inside or outside buildings, and two wireless base stations 5 and 6 respectively extending the coverage of one of the cells 3. A user or subscriber to the system carries a handset 7 which is capable of two-way radio communication with one of the fixed or wireless base stations and with other fixed and wireless base stations (not shown).

Figure 2:
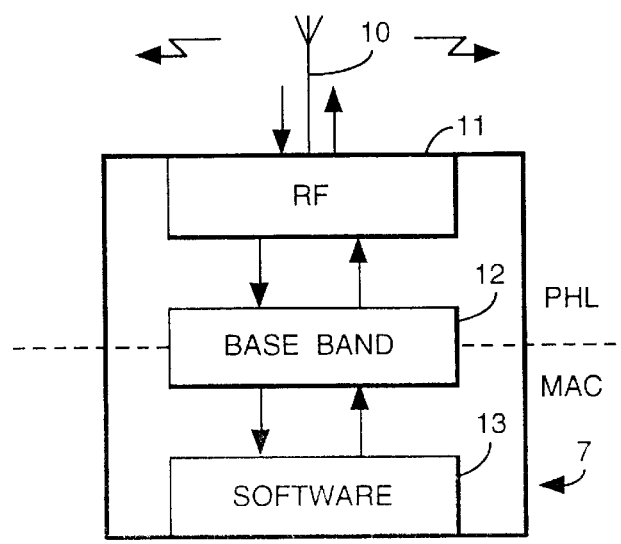
FIG. 2 is a schematic representation of a wireless base station.

A wireless base station 5 typically has the minimum of equipment and processing power to ensure effective relay of a signal from a fixed base station 1, 2 to a portable handset 7. In the DECT protocol the wireless base station will typically be concerned with the Physical Layer (PHL) that controls the division of the spectrum into physical channels and the Medium Access Control Layer (MAC) that controls selection and maintenance of good quality channels and the multiplexing of user data and control data onto the channel. In practice this means the wireless base station will have the elements illustrated in FIG. 2 ie an antenna 10, (two if it operates diversity), a radio frequency (RF) portion 11 for receiving signals over-the-air from one or more portable handsets 7 and a fixed base station 1, a base band section 12 for translating RF signals into base band signals and a processor 13 for providing the MAC functions.

A radio telephone system conforming to the DECT standard uses ten carrier frequencies, separated by 1.728 MHz, within a frequency band from 1880 MHz to 1900 MHz. This system divides time into Time Division Multiple Access TDMA frames, with each frame 20 having a time duration of 10 ms. Each frame is divided into twenty four time slots 21, numbered from 0 to 23. Each frame is divided into two halves, the first half 22 (slots 0 to 11) being reserved for the transmission of the fixed base station and the second half 23 (slots 12 to 23) being reserved for the transmission of the handset.

Figure 3:
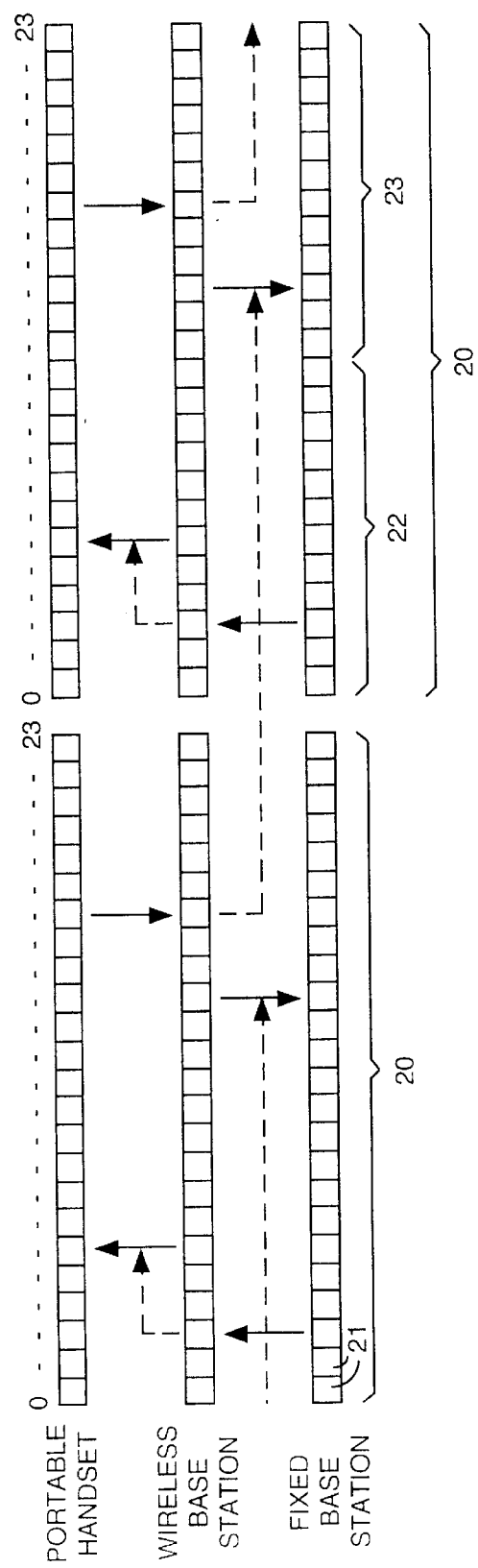
FIG. 3 is a schematic representation of an example of information flow between a fixed base station and a portable handset via a wireless base station.

In order to allow communication between a portable handset and a fixed base station, a wireless base station is able to transmit or receive in any one of the twenty four time slots available. FIG. 3 illustrates the information flow from a fixed base station to a portable handset through a wireless base station under the DECT protocol. Although the fixed base station transmits in one of the first twelve time slots of a frame (0 to 11) and the portable handset transmits in one of the second twelve time slots of a frame (12 to 23), a portable handset and a fixed base station in direct communication with each other use the same numbered slot in the respective halves of the frame for transmission and receiving, ie if the fixed base station is transmitting to the portable handset in the sixth time slot (slot 5) of the first half of the frame, the portable handset will transmit to the fixed base station in the sixth slot of the second half of the frame (slot 17).

Under the DECT protocol it is usual for the portable handset to initiate call set up. In this case it is an algorithm in the handset that determines which channel the handset uses to communicate with the wireless base station. The portable handset selects a channel with the wireless base station and attempts connection set up at this channel. Following the example given in FIG. 3 the time slot on which the handset is transmitting is the sixth time slot of the second half of the frame (slot 17). The wireless base station receives the signal from the portable handset in the same time slot and retransmits the signal received from the portable handset to the fixed base station on a suitable channel in the second half of the frame. The wireless base station can use its own algorithm (likely to be a modified version of an algorithm used by handsets) to select a channel for communication with the fixed base station. It could also rely on the fixed base station to provide the information on which channel to select. In the example illustrated, the wireless base station retransmits the signal from the portable to the fixed base station in the thirdtime slot in the second half of the frame (slot 14). The wireless base station does not receive the signal from the handset until the sixth time slot of the second half of the frame (slot 17) and must, therefore, wait for the next frame before retransmitting the signal to the fixed base station. This introduces a delay of the order of an additional 10 ms to all transmissions from the portable handset which is, however, imperceptible to the user.

Under the DECT protocol, the fixed base station transmits and receives respectively in equivalent time slots in the first and second halves of the frame. Having, in the illustrated example, received a signal from the wireless base station in the third time slot of the second half of the frame (slot 14) it transmits to the wireless base station in the third time slot of the first half of the frame (slot 2). Having received a signal from the fixed base station, the wireless base station retransmits it to the portable handset in the time slot in the first half of a frame equivalent to the transmission time slot used by the portable handset in the second half of the frame. In this example, this is the sixth slot in the first half of the frame (slot 5).

From the perspective of the portable handset, it appears to be communicating with a wireless base station by receiving signal packets in slot 5 and transmitting signal packets in slot 17. From the perspective of the fixed base station, it appears that it is communicating with a portable handset transmitting signals in slot 2 and receiving signals in slot 14. Regardless of the particular time slots utilised to set up a channel between a fixed base station and a portable handset via a wireless base station, the system operates without the fixed base station or the portable handset being aware of the delay in signalling created by the wireless base station.

Figure 4:
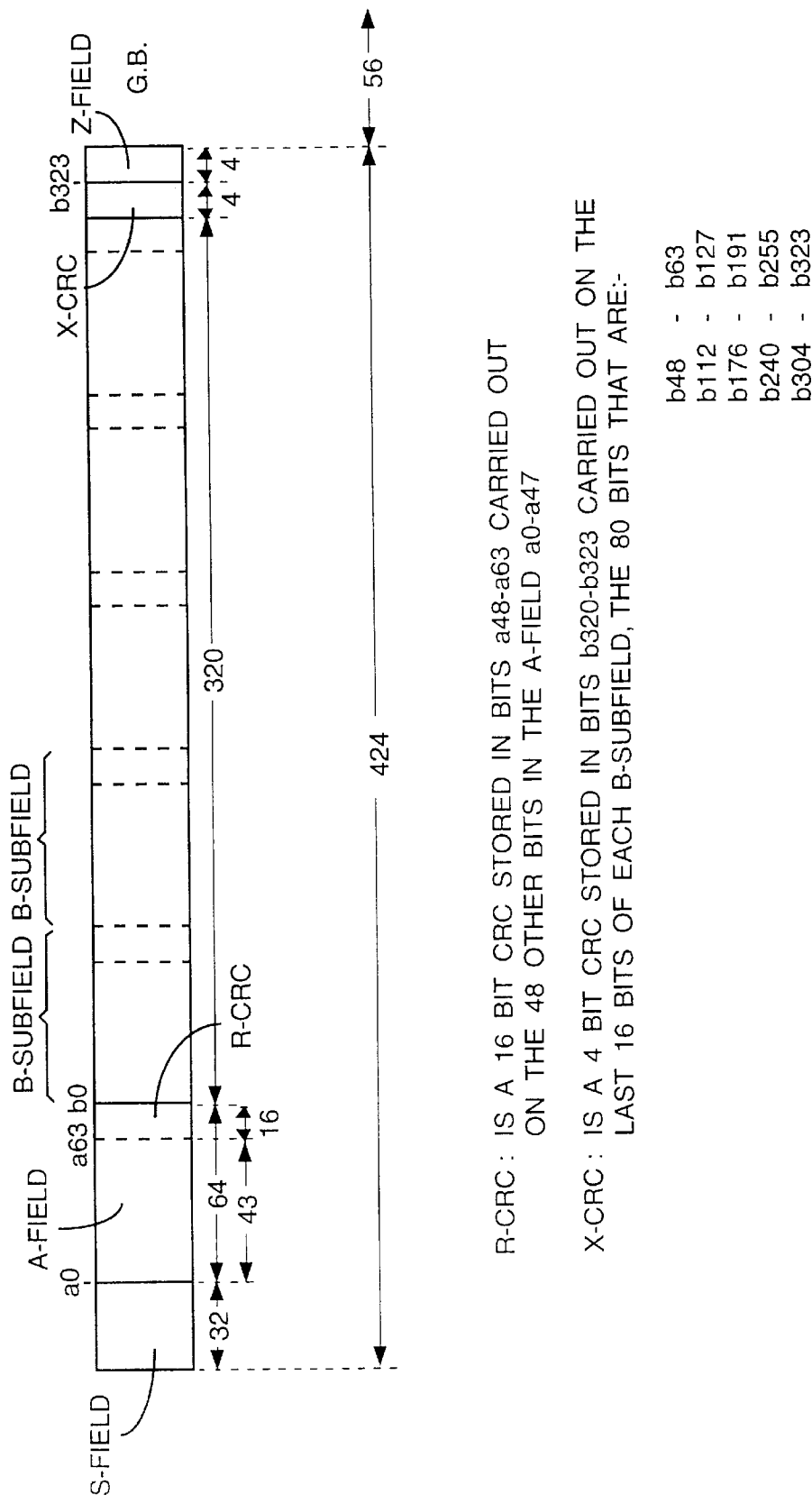
FIG. 4 is a schematic representation of a signal packet operating under the DECT protocol.

Each signal packet for transmission in one time slot of a frame is divided into four fields. The signal packet structure is illustrated in FIG. 4. The fields are as follows: an S-field used for synchronisation, an A-field used to send signalling information in accordance with the DECT protocol, a B-field for sending speech or data to a system user and a Z-field specifically for sliding error detection. In addition to the Z-field, the A and B fields have their own error detection sub-fields known as Cyclic Redundancy Checks (CRCs). The A-field is 64 bits long with the final 16 bits providing a error check on the preceding 48 bits. The B-field is 324 bits long divided into five sub-fields of 64 bits each and a four bit error detection sub-field. The four bits of the error detection sub-field are derived by operating on the last sixteen bits of each of the five sub-fields. The Z-field is a repeat of the error detection sub-field of the B-field.

In operation a portable handset reconstructs the error detection fields of the A and B fields having received the signal packet from the fixed base station. These reconstructed error fields are then compared with the error field (CRC) transmitted with the signal packet and the Z-field is also compared with the error detection field of the B-field. If there is a discrepancy this can be used by the portable handset to determine if the communication channel is corrupt. Typically a portable handset will wait until a quality monitoring algorithm detects that the link is bad before initiating handover.

When determining if the link between the fixed base station and wireless base station is bad enough to necessitate handover, the wireless base station operates in the same manner as a portable handset reconstructing the error bits for each field and comparing them with those transmitted with the signal. It may also measure the RSSI to determine the signal quality. The wireless base station can choose the criteria it employs for initiating handover to a new channel in a similar way to the handset.

Once the criteria that make handover desirable have been met, the wireless base station selects a new channel with a fixed base station, and attempts handover. This may be intercell or intracell. At the same time, in accordance with this invention, the wireless base station adapts the signal received from the fixed base station before transmitting the adapted signal to the portable handset. In order to cause minimum disruption to the handset the wireless base station will send an adapted signal to the portable handset whenever a corrupt signal is received from the base station. The wireless base station does not wait until the link is determined to be bad enough to require handover to be initiated. There may, however, be circumstances when it is preferable to allow a number of corrupt signals to be transmitted to the handset before an adapted signal is sent. In data applications and/or where error correction is a possibility it may be desirable to send a short sequence of corrupt signal packets to the handset. The number of corrupt signals suitable for sending will typically be small so as to avoid the criteria for handover by the handset being met.

In one embodiment of the invention the adapted signal includes a mute signal. This is particularly important when the handset receiving the transmitted signal is a telephony handset as unless the handset is aware that the channel is bad, it will output the signal received. When the wireless base station has established that the signal received is corrupt a mute signal is sent to the portable handset to keep the channel between the wireless base station and the portable handset open to give the wireless base station time to select and establish a new connection to the system. DECT uses Adapted Differential Pulse Code Modulation (ADPCM) (CCITT Revised Recommendation G.726 (IUT April 1991)) for which a mute would consist of consecutive ADPCM idle codes.

Figure 5:
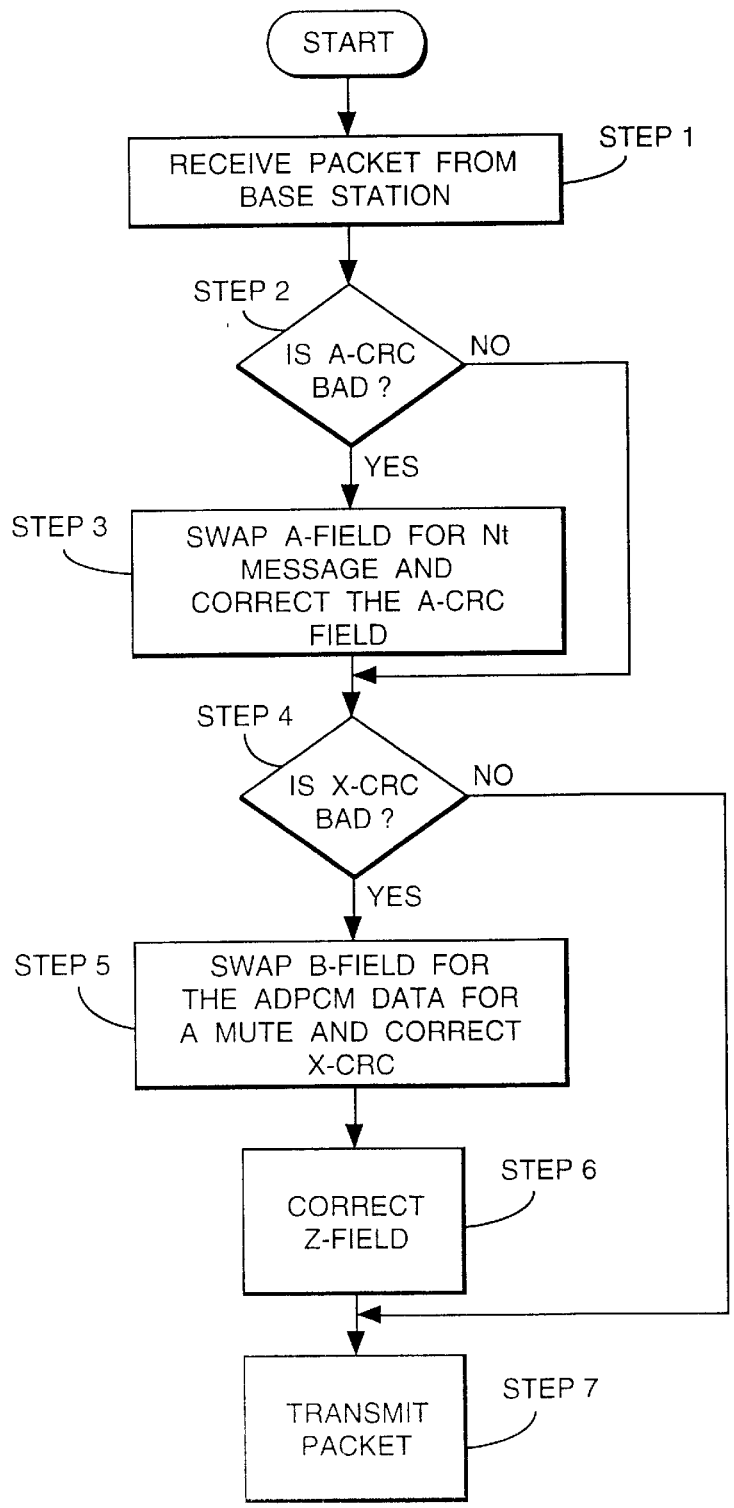
FIG. 5 is a flow chart illustrating operation of an embodiment of the invention.

FIG. 5 is a flow chart indicating the steps of a process followed by a wireless base station under the DECT protocol of one embodiment of this invention. The wireless base station receives each signal packet from the fixed base station in turn (step 1). First the wireless base station checks to see if the A-CRC field is correct (step 2). If it is, the A-field is substituted with an Nt message and the A-CRC is corrected (step 3). An Nt message in DECT is a message providing identity information. This is typically provided every other frame under normal conditions. It can, however, be transmitted every time a corrupt A-field is detected with no harm to the receiving equipment. The X-CRC is then checked (step 4). If this is bad the B-field is replaced with an ADPCM mute signal and the X-CRC is corrected (step 5). The Z-field is also replaced with the correct X-CRC (step 6).

Once all the detectable errors have been eliminated the processed or adapted signal is transmitted to the portable handset (step 7). As the signal sent from the wireless base station is free from detectable errors, unless the signal is further corrupted during transmission to the portable handset, the portable will be unaware of the problem with the link between the fixed base station and the wireless base station.

As the portable handset is unaware of any problem with the transmission channel, it will not attempt to handover. Provided the wireless base station is able to establish a suitable connection to the system, transmission of signals received from the fixed base station to the portable handset will resume without the portable handset being aware of any problem.

If the wireless base station is unable to handover after a reasonable number of attempts, the portable handset may be given the opportunity to try to handover to another wireless base station or fixed base station. This can be achieved by transmitting corrupt signals received from the fixed base station to the portable handset unadapted. The portable handset can then use its own algorithms to select and establish a new channel for connection to the system.

In another embodiment of the invention, instead of sending a dummy signal to the portable handset, the wireless base station changes the signal it transmits to the portable handset to provide additional information to the handset. By using one of the signalling bits currently unspecified in the DECT protocol the wireless base station can indicate to the portable handset that the channel between the wireless base station and the fixed base station is corrupt. Although the CRCs will indicate an error in the signal the portable handset will be aware that it is the link between the fixed base station and wireless base station that is causing the errors. The portable handset can then use this information to overcome the problem of unnecessary handover in accordance with its own algorithms. The portable may initiate handover after delaying for a suitable period. The period of delay will preferably be long enough for the wireless base station to handover under normal circumstances.

The additional signalling information described in the second embodiment could be sent to the handset along with an adapted signal that has had its CRCs corrected to be consistent with the signal actually transmitted to the handset. In this case, no mute signal would be generated by the wireless base station. The handset would be aware that the signal it was receiving contained errors and therefore that the link between the wireless and fixed base stations was poor although it would be unable to detect the errors via the CRCs. Advantageously, if the signal was further corrupted en route to the handset, the CRCs would indicate a poor link between the handset and the wireless base station. This provides the handset with greater control over the quality and type of signal played through the audio section when errors are detected as well as full control over when handover should be requested.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention in particular the invention is applicable for use under other protocols including Wireless Customer Premises Equipment (WCPE) and Personal Handyphone System (PHS).

What is claimed is:

1. A wireless base station for use in a cellular radio telephone system in which a wireless base station is involved in establishing a communication channel between a fixed base station and a radio handset for transmitting signals from the fixed base station to the radio handset, the communication channel comprising a first part between the fixed base station and the wireless base station and a second part between the wireless base station and the radio handset, the wireless base station comprising means responsive to an indication that the first part of the communication channel between the wireless base station and the fixed base station is corrupt for transmitting an adapted signal to the radio handset to maintain the second part of the communication channel between the wireless base station and the radio handset.

2. A wireless base station according to claim 1 for use in a system in which signals are transmitted in packets, and wherein the adapted signal is transmitted if a signal packet received from the fixed base station is corrupt.

3. A wireless base station according to claim 1 wherein the wireless base station initiates handover if the quality of signals received from the fixed base station fail to meet predetermined criteria.

4. A wireless base station according to claim 1 wherein the means for transmitting is further responsive to an indication that a suitable channel for communication with the fixed base station cannot be established for providing a signal indicative of a corrupt channel to the radio handset.

5. A wireless base station according to claim 4 for use in a system in which signals are transmitted in packets wherein the adapted signal that is indicative of a corrupt channel is at least one corrupt signal packet received from the fixed base station and that is transmitted to the radio handset.

6. A wireless base station according to claim 1 wherein the means for transmitting an adapted signal comprises means for providing a signal capable of providing information on the quality of the first part of the communication channel between the wireless base station and the fixed base station.

7. A wireless base station according to claim 1 wherein the means for transmitting comprises means for providing a signal representative of a predetermined message.

8. A wireless base station according to claim 7 wherein the signal representative of a predetermined message is a mute signal.

9. A wireless base station according to claim 1 wherein the means for transmitting an adapted signal comprises means for transmitting an indication to the radio handset that the radio handset should pause for a period before initiating handover.

10. A wireless base station according to claim 9 wherein the radio handset is adapted to pause before initiating handover in response to the indication transmitted from the wireless base station.

11. A wireless base station according to claim 1 wherein signals received by the wireless base station comprise error detection information for enabling a corrupt signal to be detected and wherein the means for transmitting comprises means for replacing the error detection information such that the error detection information indicates that the signal transmitted to the radio handset is not corrupt.

12. A cellular radio telephone system comprising a radio handset and a wireless base station for establishing a communication channel between a fixed base station and the radio handset, the communication channel comprising a first part between the fixed base station and the wireless base station and a second part between the wireless base station and the radio handset, the wireless base station comprising means responsive to an indication that the first part of the communication channel between the wireless base station and the fixed base station is corrupt for transmitting an adapted signal to the radio handset to maintain the second part of the communication channel between the wireless base station and the radio handset.

13. A method of communicating between a wireless base station and a radio handset in a cellular radio telephone system in which a wireless base station is involved in establishing a communication channel between a fixed base station and a radio handset, the communication channel comprising a first part between the fixed base station and the wireless base station and a second part between the wireless base station and the radio handset, the method comprising steps of:

determining that the first part of the communication channel between the wireless base station and the fixed base station is corrupt; and transmitting an adapted signal to the radio handset in response to an indication that the first part of the communication channel between the wireless base station and the fixed base station is corrupt in order to maintain the second part of the communication channel between the wireless base station and the radio handset.

14. A method according to claim 13 for use in a system in which signals are transmitted in packets, and wherein the adapted signal is transmitted if a signal packet received from the fixed base station is corrupt.

15. A method according to claim 13 wherein the wireless base station initiates handover if the quality of signals received from the fixed base station fail to meet predetermined criteria.

16. A method according to claim 15 wherein if the wireless base station is unable to handover within a predetermined period a signal indicative of a corrupt channel is transmitted to the radio handset.

17. A method according to claim 13 wherein the step of adapting a signal comprises providing a signal capable of providing information on the quality of the first part of the communication channel between the wireless base station and the fixed base station.

18. A method according to claim 13 wherein the means for transmitting comprises means for providing a signal representative of a predetermined message.

19. A method according to claim 18 wherein the signal representative of a predetermined message is a mute signal.

20. A method according to claim 13 wherein the step of adapting the signal comprises providing a predetermined signal for indicating to the radio handset that the radio handset should pause for a period before initiating handover.

21. A method according to claim 13 wherein signals received by the wireless base station comprise error detection information for enabling a corrupt signal to be detected and wherein the step of transmitting comprises replacing the error detection information such that the error detection information indicates that the signal transmitted to the radio handset is not corrupt.

22. A method according to claim 13 wherein the wireless base station is further responsive to an indication that a suitable channel for communication with the fixed base station cannot be established for providing a signal indicative of a corrupt channel to the radio handset such that the radio handset is able to initiate handover.

23. A method according to claim 22 wherein the adapted signal that is indicative of a corrupt channel is at least one corrupt signal received from the fixed base station and that is transmitted to the radio handset.

* * * * *